United States Patent
DuRant

(10) Patent No.: US 7,229,046 B2
(45) Date of Patent: Jun. 12, 2007

(54) SERVO MOUNTING SYSTEM FOR DIRECT DRIVE OF AN AIRCRAFT CONTROL SURFACE

(76) Inventor: Cecil John DuRant, 5502 Thunderbird CT, Granbury, TX (US) 76049

( * ) Notice: Subject to any disclaimer, the term of this patent is extended or adjusted under 35 U.S.C. 154(b) by 4 days.

(21) Appl. No.: 11/163,619

(22) Filed: Oct. 25, 2005

(65) Prior Publication Data

US 2007/0102588 A1 May 10, 2007

(51) Int. Cl.
- B64C 13/00 (2006.01)
- B64C 9/00 (2006.01)
- B64C 3/38 (2006.01)
- B64C 13/20 (2006.01)

(52) U.S. Cl. .................. 244/76 A; 244/99.2; 244/190; 244/87; 244/90 R; 244/91; 244/99.3; 244/225

(58) Field of Classification Search ............... 244/99.2, 244/99.3, 225, 87, 88, 89, 90 R, 91, 201, 244/231, 76 A, 190, 228

See application file for complete search history.

(56) References Cited

U.S. PATENT DOCUMENTS

| | | | | |
|---|---|---|---|---|
| 2,265,213 | A * | 12/1941 | White | 244/87 |
| 2,295,306 | A * | 9/1942 | Tampier | 244/99.9 |
| 2,315,110 | A * | 3/1943 | Dornier | 74/625 |
| 2,966,808 | A * | 1/1961 | Grudin | 74/640 |
| 3,239,733 | A * | 3/1966 | Sikorra | 318/616 |
| 4,180,222 | A * | 12/1979 | Thornburg | 244/225 |
| 4,274,610 | A * | 6/1981 | Bastian | 244/3.22 |
| 4,531,417 | A * | 7/1985 | Hollman | 74/96 |
| 4,575,027 | A * | 3/1986 | Cronin | 244/99.12 |
| 4,688,744 | A * | 8/1987 | Aldrich | 244/99.9 |
| 4,762,294 | A * | 8/1988 | Carl | 244/99.9 |
| 4,765,568 | A * | 8/1988 | Carl et al. | 244/197 |
| 4,932,613 | A * | 6/1990 | Tiedeman et al. | 244/213 |
| 4,979,700 | A * | 12/1990 | Tiedeman et al. | 244/99.2 |
| 5,129,310 | A * | 7/1992 | Ma | 91/171 |
| 5,531,402 | A * | 7/1996 | Dahl | 244/99.2 |
| 5,622,336 | A * | 4/1997 | Chavanne et al. | 244/129.1 |
| 5,791,596 | A * | 8/1998 | Gautier et al. | 244/76 R |
| 5,810,284 | A * | 9/1998 | Hibbs et al. | 244/13 |
| 5,884,872 | A * | 3/1999 | Greenhalgh | 244/201 |
| 6,231,013 | B1 * | 5/2001 | Jaenker | 244/215 |
| 6,386,482 | B1 * | 5/2002 | Capewell | 244/129.1 |
| 6,672,540 | B1 * | 1/2004 | Shaheen et al. | 244/99.3 |
| 6,705,570 | B1 * | 3/2004 | Degenholtz et al. | 244/99.2 |
| 6,739,550 | B2 * | 5/2004 | Koizumi et al. | 244/99.4 |
| 7,021,587 | B1 * | 4/2006 | Younkin | 244/178 |
| 7,044,024 | B1 * | 5/2006 | Younkin | 74/665 A |
| 7,048,234 | B2 * | 5/2006 | Recksiek et al. | 244/213 |
| 7,051,975 | B2 * | 5/2006 | Pohl et al. | 244/213 |
| 7,121,506 | B2 * | 10/2006 | Clancy | 244/99.2 |

(Continued)

Primary Examiner—Teri Pham Luu
Assistant Examiner—Joshua Michener

(57) ABSTRACT

This invention is a servo mounting system, which allows a servo with a rotating output shaft to directly power an aircraft control surface. A specially designed servo mount securely positions the servo with the central axis of its rotational output shaft on, and axially aligned with, the hinge line of the control surface it drives. The servo shaft and servo body are directly connected to the airframe and control surface, thereby conserving rotational motion while driving control movement. Electronic means are then used to control the neutral point and the limit of travel of the servo. The system eliminates lost motion without generating adverse linear loads within the drive assembly.

13 Claims, 11 Drawing Sheets

U.S. PATENT DOCUMENTS 7,182,297 B2 * 2/2007 Jackson ....................... 244/231
2005/0178897 A1 * 8/2005 Moreno .................... 244/75 R
2006/0049306 A1 * 3/2006 Kim et al. .................... 244/72

* cited by examiner

SERVO MOUNTING SYSTEM FOR DIRECT DRIVE OF AN AIRCRAFT CONTROL SURFACE

SEQUENCE LISTING

Not Applicable.

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

1. Field of the Invention

This servo mount design is related to the specific connection between the device or arrangement for controlling an aircraft and a controlled element.

2. Description of Related Art including information disclosed under 37 CFR 1.97 and 1.98

It is often necessary or desirable to power the motion of an aircraft control surface with an electro-mechanical servo. The most common use of servo powered flight controls is in the radio controlled aircraft hobby industry. There is also a rapidly growing market for commercial and military remotely piloted vehicles, which also employ the use of servos to power their flight controls. The latest trend in full scale aviation is all electric flight control actuation, or "fly by wire". It is conceivable that servo powered flight controls will replace the hydro-mechanical powered systems predominantly used in manned aircraft today, since they are very compatible with the fly by wire concept. There are a large variety of commercially available servos which provide an output via a rotating shaft. In all previous endeavors, the servo is mounted to the airframe in a location other than on the hinge line of the control surface it powers, and the servo shaft drives the control surface through a linkage in one or a combination of the following manners:

(a) The servo shaft is fitted with a lever arm (servo arm), which is connected to a lever arm on the control surface through a mechanical link. The link is rigid enough to transfer both push and pull forces between the two arms, thereby transferring the rotational motion of the servo shaft to the control surface.

(b) The servo shaft is fitted with two parallel and opposing lever arms, 180 degrees apart, which are connected to matching double lever arms on the control surface via two pull cables. In this way each cable transfers a pull force from the servo arm to which it is attached to the respective control surface arm, thereby transferring the rotational motion of the servo shaft to the control surface. Each cable transfers motion in only one direction.

(c) The servo shaft is fitted with a pulley, which is connected to a corresponding pulley on the control surface through pull cables. As in (2) above, the cables serve to transfer the rotational motion of the servo shaft to the control surface.

The above methods of driving a control surface involve a conversion of rotational motion at the servo shaft to linear motion, which is then reconverted back to rotational motion at the control. There are several inherent problems with these linkage drive systems:

(a) A linkage generates a linear load which must be absorbed by both the servo shaft bearings and the control surface hinges. The linear load is at its greatest when the control is fully deflected, which is also the point when the air loads on the control hinges are highest. Both these loads are additive on the hinges. This load accelerates wear on the servo bearings and control hinges, thereby increasing the need for periodic maintenance and part replacement.

(b) At large control surface deflections, the geometry of a link or cable becomes severe.

(1) The effective lengths of the lever arms become shorter at high control deflections when the air loads are strongest. This results in an exponentially increasing load on the servo and the control hinge. To reduce compliance in the structure due to these loads, the control drive assembly must be strengthened significantly. The result is added weight, which has negative aircraft performance consequences.

(2) At the extremes of control travel, linkage angularity results in non-linear control deflection rates. That is, the control moves at a different angular rate than the angular rate of the servo output shaft. This requires complicated electronic or mechanical compensation to return control movement to a proportionally linear motion.

(c) Friction is generated at the connection points of a link, the servo bearings, and the control hinge. Friction subtracts from the servo power that reaches the control surface. To compensate, a stronger servo is required, which again means more weight to the aircraft.

(d) A linkage must have some tolerance at the connecting points to ensure it is free to pivot. As the connections wear, the tolerance naturally increases. Additionally, when force is applied through any mechanical assembly, there is deflection due to stress. In a cable linkage, the cables stretch significantly under load. The end result of these factors is lost motion between the servo and the control surface. Lost motion is detrimental for two reasons:

(1) Lost motion allows air loads to deflect the control surface from the commanded position. This reduces the precision control of the surface, thereby reducing effective control of the aircraft.

(2) Lost motion reduces the overall stiffness of the control assembly, which increases the risk of control surface flutter. Flutter is potentially catastrophic to the structural integrity of an aircraft.

(e) By their nature, linkage elements located at the control surface introduce mass behind the hinge line. This increases the weight of the surface, thereby increasing the tendency of the surface to flutter. Larger counterweights must be used to compensate for the weight of the control drive component, thereby adding weight to the aircraft.

Even with the mentioned shortcomings, linkages were necessary in past endeavors because:

(a) Early generation servos were underpowered, which required a properly designed linkage to increase the mechanical advantage of the servo over the control surface.

(b) Early generation servos had limited adjustment capability and no ability to change the direction of shaft motion in relation to an input. An adjustable linkage was necessary to center the control surface at the neutral point and/or to reverse the direction of control motion in relation to servo shaft motion.

(c) A few years ago, it was accepted that control surface travel should be limited to less than 30 degrees from the center position for aerodynamic reasons. In the past, commercially available servos had a range of travel in excess of 45 degrees from center with no limit of travel adjustment, which made a motion reduction linkage necessary to reduce the range of travel to accepted limits at the control surface.

In recent years, however, there have been numerous advances in both servo and aircraft design, so we are no longer bound by the limitations of just a few years ago. It has been shown that there is performance to be gained from using control travel in excess of 45 degrees. Electronic servo controls now make it possible to adjust the travel limit, set the centering point, and change the direction of rotation of the servo shaft without the need for cumbersome and restrictive mechanical linkages to do the same. Improved motor technology has provided servos that are now strong enough to drive a control surface without the need for mechanical advantage. Linkage ratios on servo driven flight controls are frequently reduced to 1:1. The traditional reasons for using a linkage between a servo and the control it drives no longer apply. It is now possible to drive an aircraft control surface directly from the servo shaft, without intermediary mechanisms to modify the servo output.

This method of directly driving the control surface has still not been used since current servo case design impedes doing so. Commercially available servos share a common generic mounting method in which tabs are provided on each end of the case to mount the servo using two or more screws to a fixed position on the airframe. This tab system provides flexibility in mounting the servo in the greatest number of standard applications, all of which involve the use of linkages to transfer the servo motion to the control. Though providing flexibility, the resulting design of the modern commercial servo is not at all suited to being mounted on the hinge line of a control surface.

The output shaft is near the middle of the servo body, which is an undesirable location for hinge line mounting as it causes the servo case to protrude significantly into the area occupied by the control surface. The provided mounting tabs extend further into the control surface space, further obstructing control motion. Because a large portion of the servo body, including half of the mounting tabs, is located past the hinge line, there is no obvious way to secure the servo to the aircraft. The mounting tabs are placed in an inconvenient, normally inaccessible location, and are at an awkward angle when securing the servo at the hinge line. In short, the standard shape and design of commercially available servos has precluded them from even being considered for hinge line mounting. Therefore, direct servo drive of an aircraft control surface is not an obvious or inevitable evolution of prior art.

BRIEF SUMMARY OF THE INVENTION

This invention has overcome the problems associated with using generic servos to directly drive aircraft flight controls. The object of this invention is to provide an improved aircraft flight control servo drive system, decrease cost of manufacture, decrease required maintenance, and increase the reliability of the drive mechanism. A servo mounting system is described herein to mount a servo in a position and manner which allows it to drive a control surface 13 directly, with no intermediary linkages. This is accomplished through a unique servo mount 1A, which secures the servo with the central axis of its rotational output shaft 15 on, and axially aligned with, the control surface hinge line 12. The result is a simple and efficient drive mechanism which conserves rotational motion throughout the drive assembly. The servo mount 1A described herein can be installed in an aircraft in two basic ways:

(a) Airframe mounting, as shown in FIG. 4A. The servo case 14 is secured within the servo mount 1A which is installed on the airframe, shown as a wing aerodynamic member 10, so the central axis of the servo output shaft 15 is located on, and is axially aligned with, the control surface hinge line 12. The servo output shaft 15 is connected directly to the control surface, shown as an aileron aerodynamic member 13, so the control and shaft are effectively a single unit 2. The servo case 14 remains fixed relative to the airframe 10, while the shaft 15 rotates with the control surface 13. The only intermediary mechanism between the servo and control surface is a coupler, shown as a standard servo lever arm 17. The coupler can be either rigid, as shown, or one allowing for slight misalignment between the shaft and control surface.

(b) Control surface mounting, as shown in FIG. 6A. The mount 1A is installed within the control surface, shown as an elevator aerodynamic member 24, so the axial center of the servo output shaft 15 is located on, and is axially aligned with, the control surface hinge line 12. The servo output shaft 15 is connected directly to the airframe, shown as a horizontal stabilizer aerodynamic member 23, so the airframe and shaft effectively become a single unit. The servo case 14 moves with the control surface 24, while the shaft 15 remains fixed relative to the airframe 23. The only intermediary mechanism between the servo and the airframe is a coupler, shown as a standard servo lever arm 17. The coupler can be either rigid, or one allowing for slight misalignment between the shaft and the airframe.

The direct drive servo mount can be applied to any control surface which uses a fixed hinge line. Examples include, but are not limited to:

(a) Ailerons.
(b) Elevators and stabilators.
(c) Rudders.
(d) Speed brakes.
(e) Trailing or leading edge flaps.
(f) Attenuators.
(g) Trim tabs.
(h) Control tabs.
(i) Anti-float tabs.
(j) Any combination surfaces, such as ailevators, flaperons, etc.

The advantages of direct drive servo mounting over traditional linkage style drive systems are numerous:

(a) No linear loads are created.
   (1) This reduces servo bearing and control hinge wear.
   (2) It allows lighter mounting structures to be used to save weight.
   (3) It decreases routine maintenance intervals and prolongs component longevity.
(b) There is no lost motion. This increases control positioning precision and increases control flutter resistance.
(c) There is no lost force due to friction. All of the servo power is transferred to the control surface without loss throughout the full range of travel. This allows a somewhat smaller servo to be utilized and again reduces weight.
(d) Control motion is directly proportional to servo motion. No mechanical or electronic compensation is required to rectify linkage geometry problems.
(e) Less mass is introduced behind the control surface hinge line, which improves control flutter resistance.
(f) There are fewer parts, which reduces production cost and increases reliability.
(g) There are no arms, cables or pulleys to protrude into the air stream. This makes a cleaner aerodynamic design with reduced aerodynamic drag.
(h) There is no linkage mass to apply undesirable inertial loads on the servo or flight control when the aircraft is maneuvering.

BRIEF DESCRIPTION OF THE SEVERAL VIEWS OF THE DRAWINGS

The following are descriptions of the diagrams contained in this specification.

DETAILED DESCRIPTION OF THE INVENTION

Although the direct servo drive mount is not limited to a particular aircraft size, material of construction, servo size or servo type—for ease of illustration the following description of embodiment will reference installations in a large model aircraft of 130 inches wingspan. The aircraft is a typical large scale model design, constructed of wood and composite materials. The horizontal stabilizer 23 employs a tubular metal spar 22 onto which the horizontal stabilizer 23 is mounted, permitting removal of the stabilizer as an assembly by sliding it off of the spar 22. The servo being mounted is a generic, commercially available electro-mechanical design, loosely termed in the model industry as "standard" size, with dimensions of 0.76" by 2.25" by 1.5".

Figure 1A:
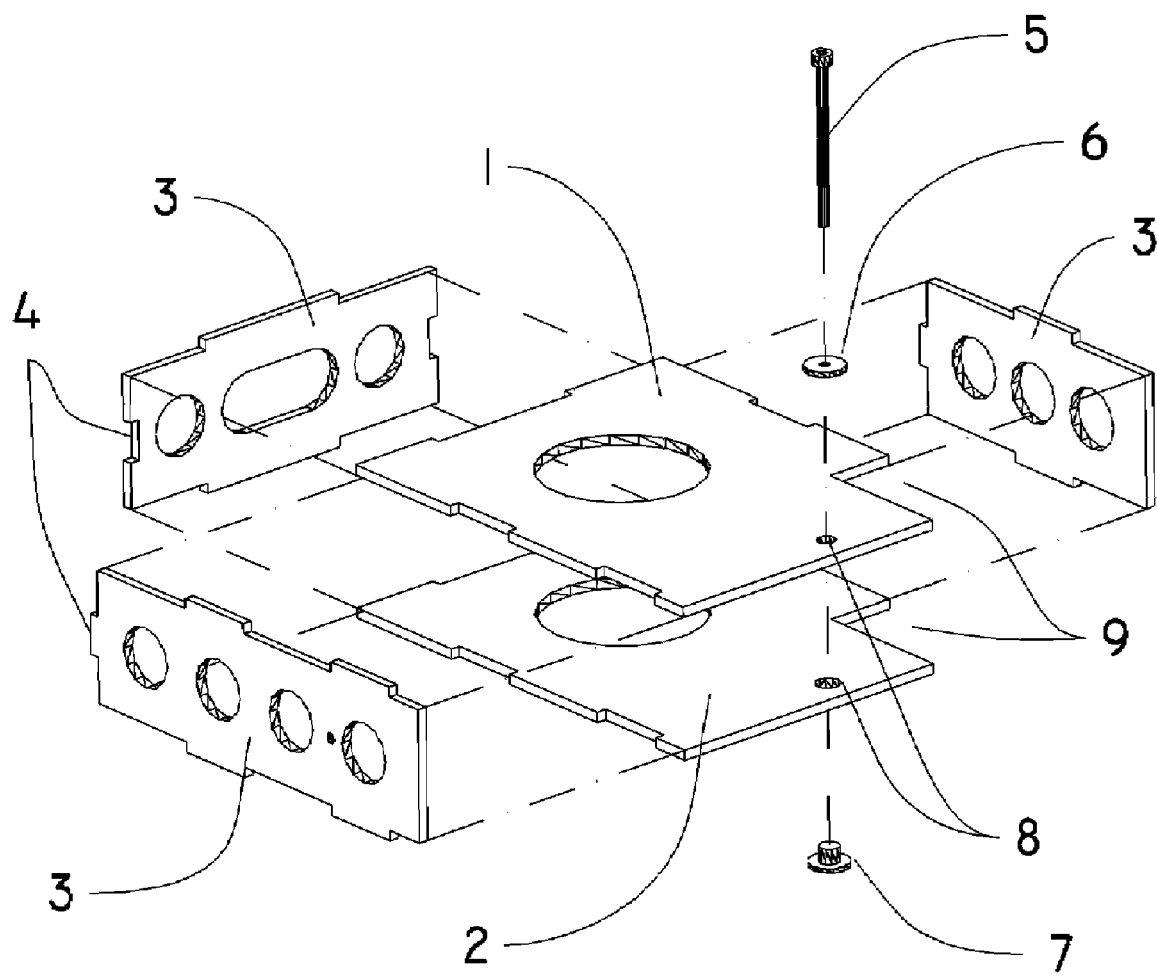
FIG. 1A is an exploded view of the servo mounting box 1A.

The direct drive servo mount in FIG. 1A is in the form of a hollow box which is sized to the dimensions of the particular servo being used. Shown are the upper plate 1, lower plate 2, and three sides 3. One side of the mount is open, allowing the servo to slide into the mount with a perfect—or slight interference—fit. Bolt holes 8 are provided through the plates 1 and 2. These allow a bolt 5, washer 6 and nut 7 to be installed through the plates to tighten the plates onto the servo, thereby clamping the servo in place. In operation, there are no loads placed on the servo in the direction of the mount opening, so the purpose of the bolt 5 is to ensure there is no space between the servo and the mount. Any space in the mating of the mount to the servo will result in lost motion as the servo drives the control surface. If an interference fit (0.001"-0.002") is used between the box and servo, the bolt 5 is not required. A relief 9 is cut into one of the open corners of the mount, to allow for motion of the control horn 16, shown in FIG. 2. The control horn 16 is an extension of the servo arm 17. It is fashioned so it can be attached to a generic servo arm 17, compatible with the servo being used, and also can be attached to the appropriate aircraft structure, here shown as an aileron aerodynamic member 13. In order to keep weight to a minimum, the horn 16 is fashioned in the shape of a rib. In doing so, the horn 16 takes the place of an otherwise required structural rib, so no weight is added to the final assembly.

The material used in construction of the mount and horn can be metal, wood, plastic, composite, or any other relatively light weight material. Choice of material is primarily determined by compatibility with the material used in the aircraft. For example, if the aircraft is built of wood, it is preferable to use wood in the mount, as this will allow positive bonding with the aircraft structure. Alternatively, if the aircraft is made of aluminum, the mount must be of a material that can be riveted, welded, or bolted to aluminum.

Lightening holes are provided in the mount to reduce weight, but their exact size and placement are not critical.

The box shown in FIG. 1A is constructed of 1/16" thick maple plywood. It was cut precisely by a laser cutter to match the dimensions of the servo it will retain and is provided with non-specific lightening holes. The mating tabs 4 at each joint increase strength and rigidity without sacrificing weight. The inside dimensions of the opening is height 0.76", width 1.75", and depth 2.5". Only the height dimension is critical, as it must match the corresponding minor servo dimension. The width and depth should be slightly larger than their corresponding servo dimensions (approximately 0.25"), but other than that are not critical. The box is glued together using wood glue. If constructed of other materials, the box may be molded, bolted, or riveted together as required.

Figure 2:
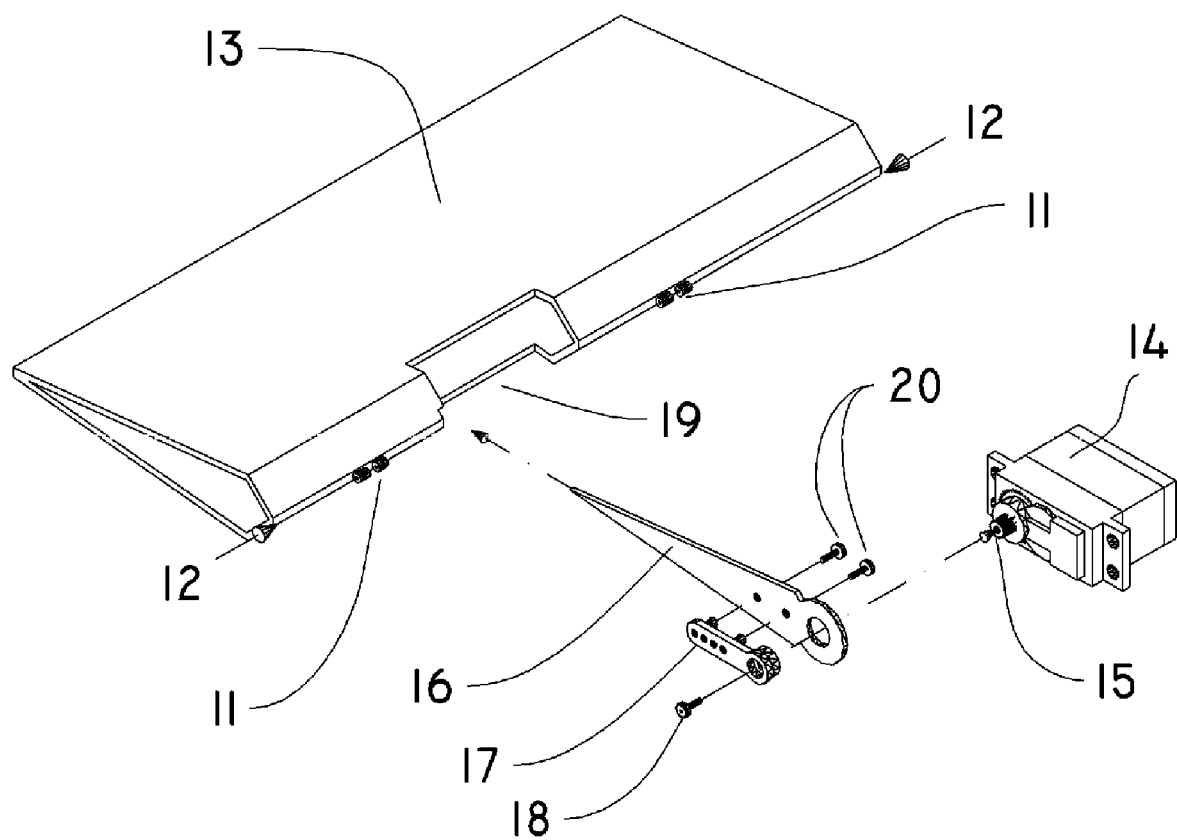
FIG. 2 is an exploded view of the aft aerodynamic member of a wing airfoil (control surface) 13, showing in detail how the servo rotational output shaft 15 is attached to the control surface 13 to form a sub-assembly 2.
Figure 3:
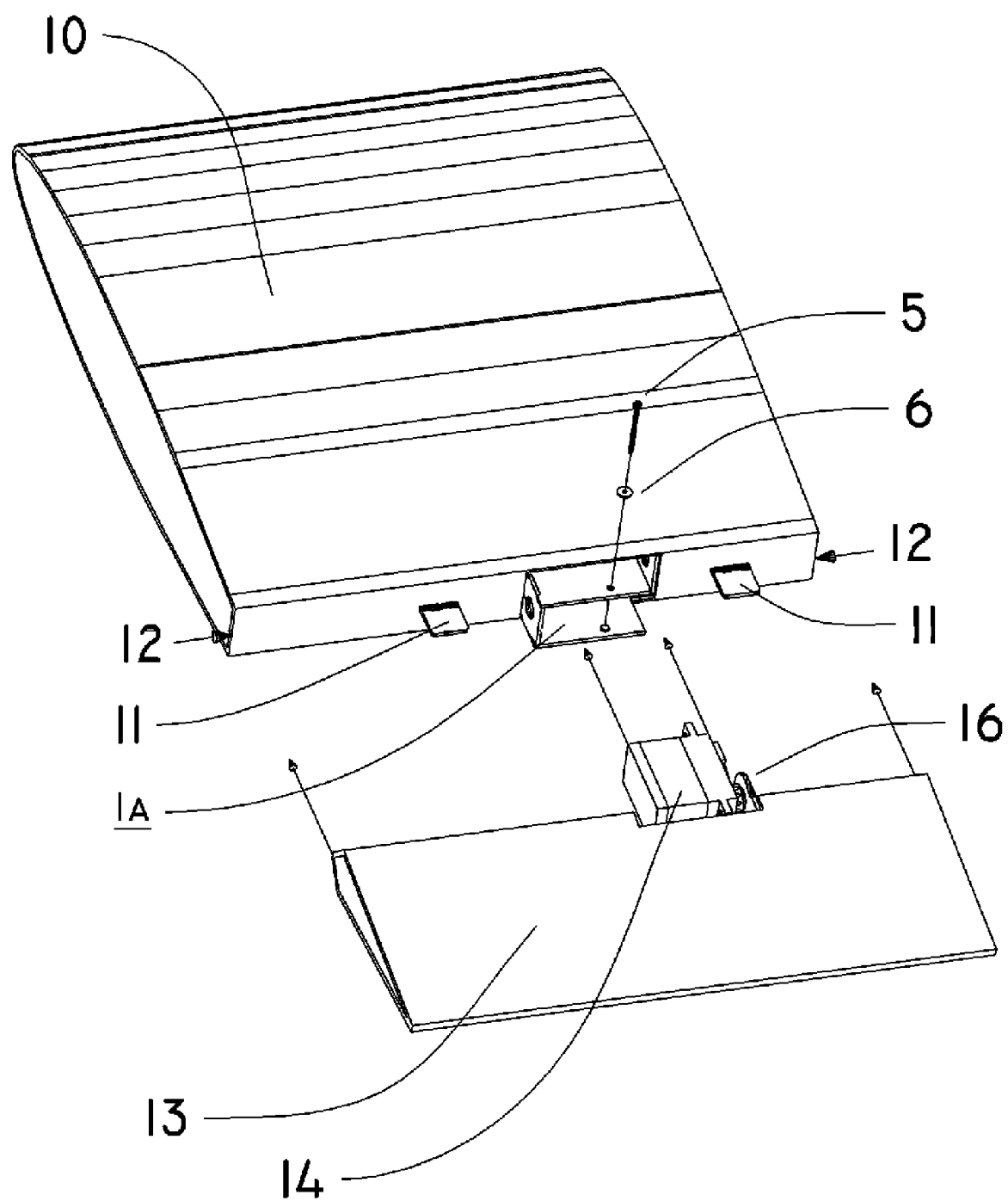
FIG. 3 shows the method of final assembly. The servo case 14 slides into the mount 1A as the control/servo subassembly 2 is moved into place. Hinge pins are installed to hold the surface 13, and a bolt 5 securely clamps the servo case 14 within the mount 1A.
Figure 4A:
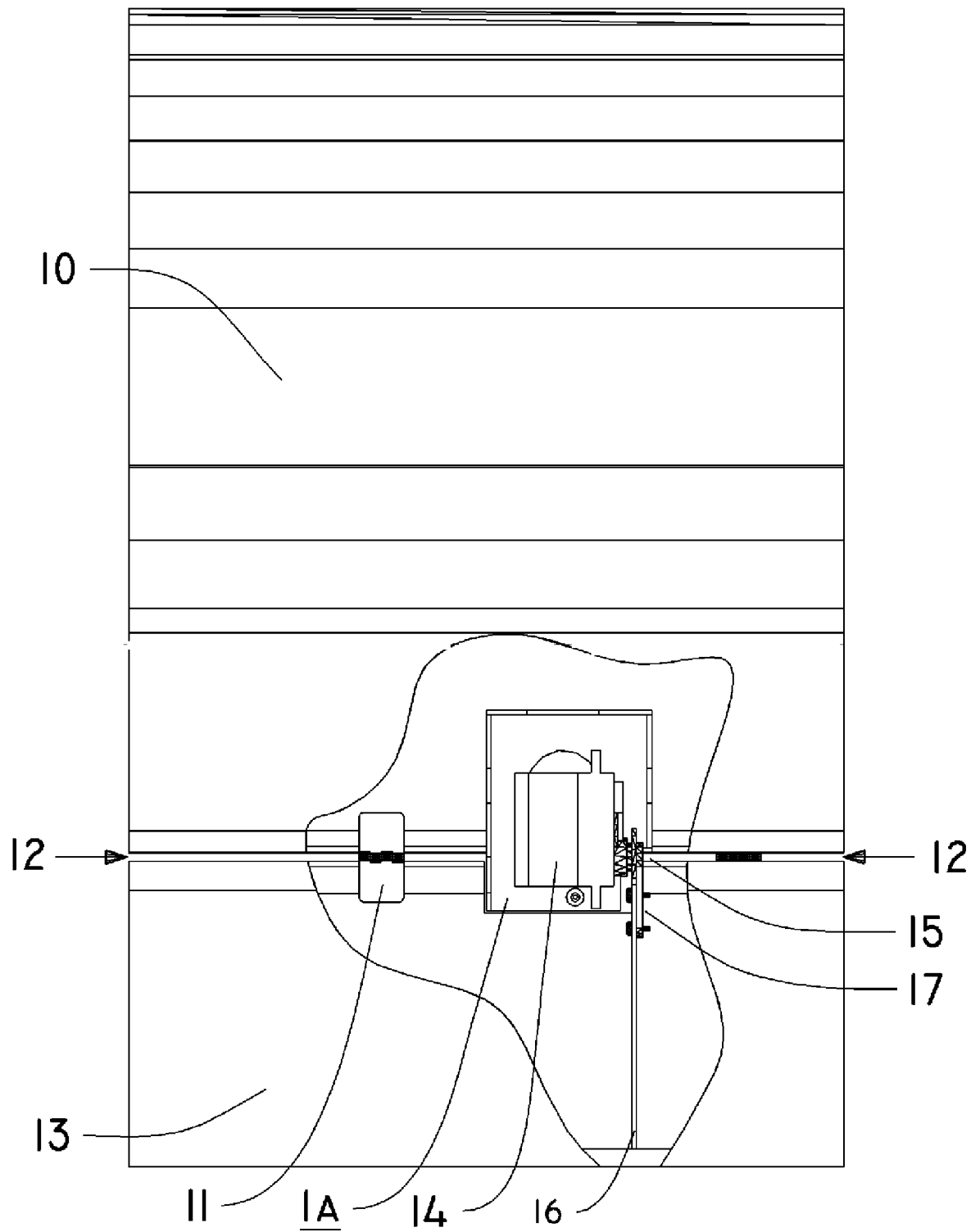
FIG. 4A is a top plan view of the completed servo mount assembly. The top of the wing 10 and the top of servo mount 1A have been removed for clarity.
Figure 4B:
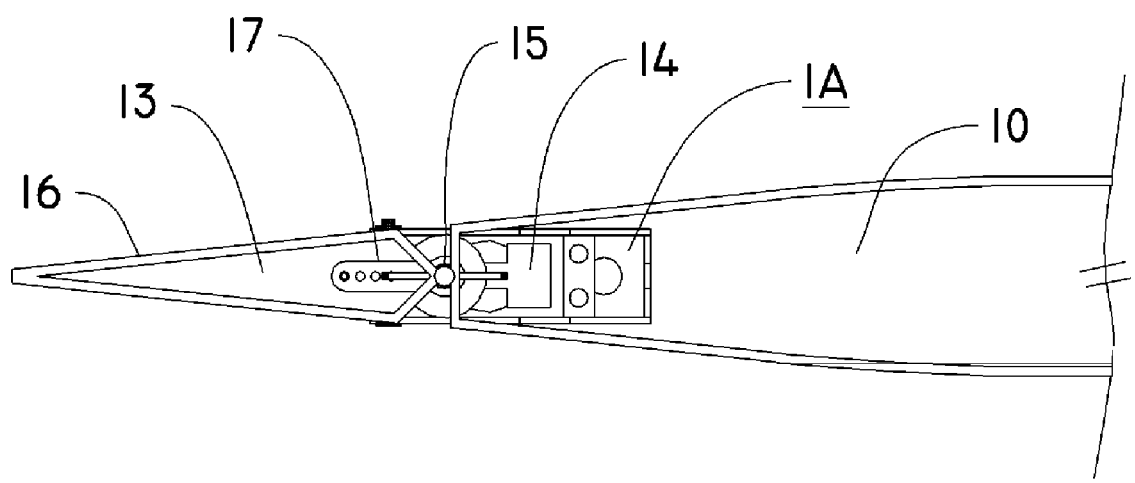
FIG. 4B is a side elevation sectional view of the completed assembly, demonstrating the smooth airfoil—devoid of protuberances—which this mounting system provides.
Figure 4C:
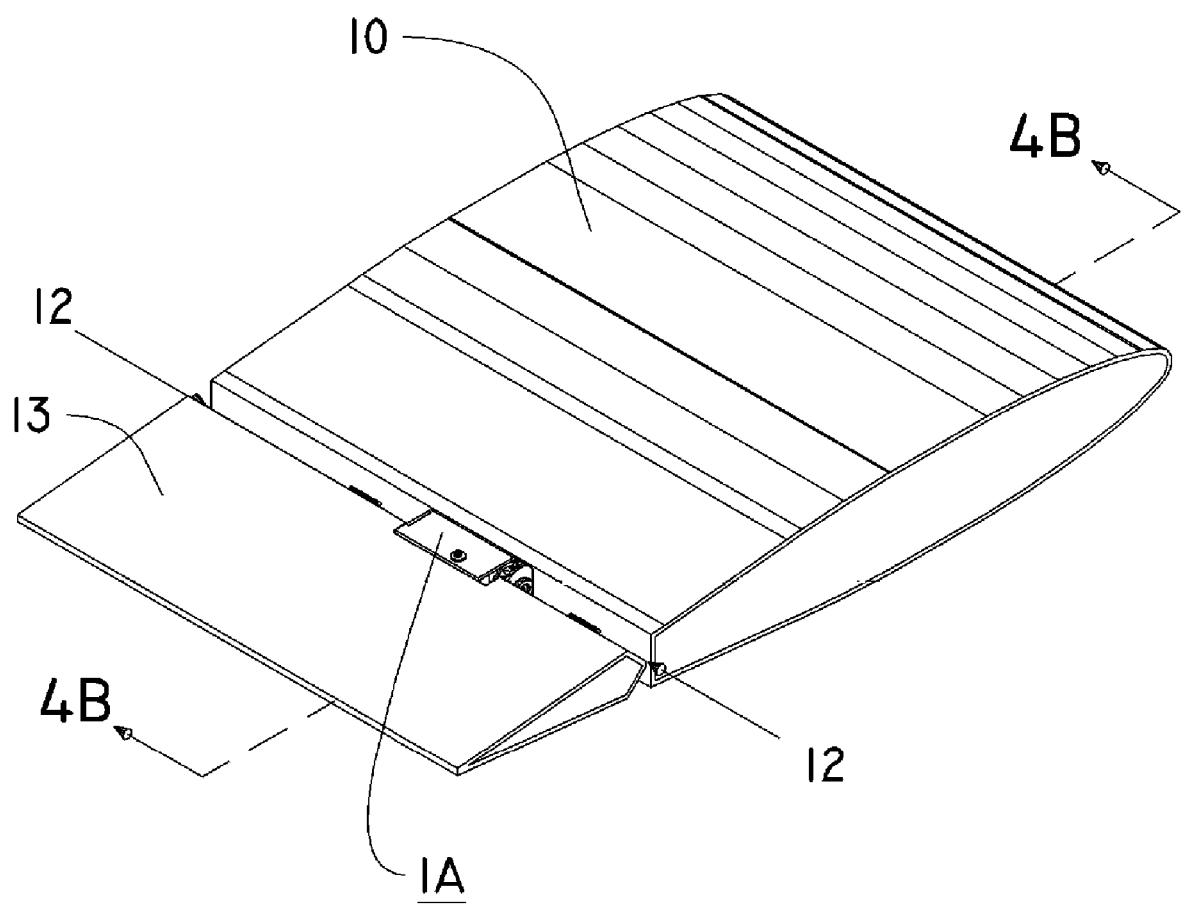
FIG. 4C is an orthographic view of the completed assembly.
Figure 5A:
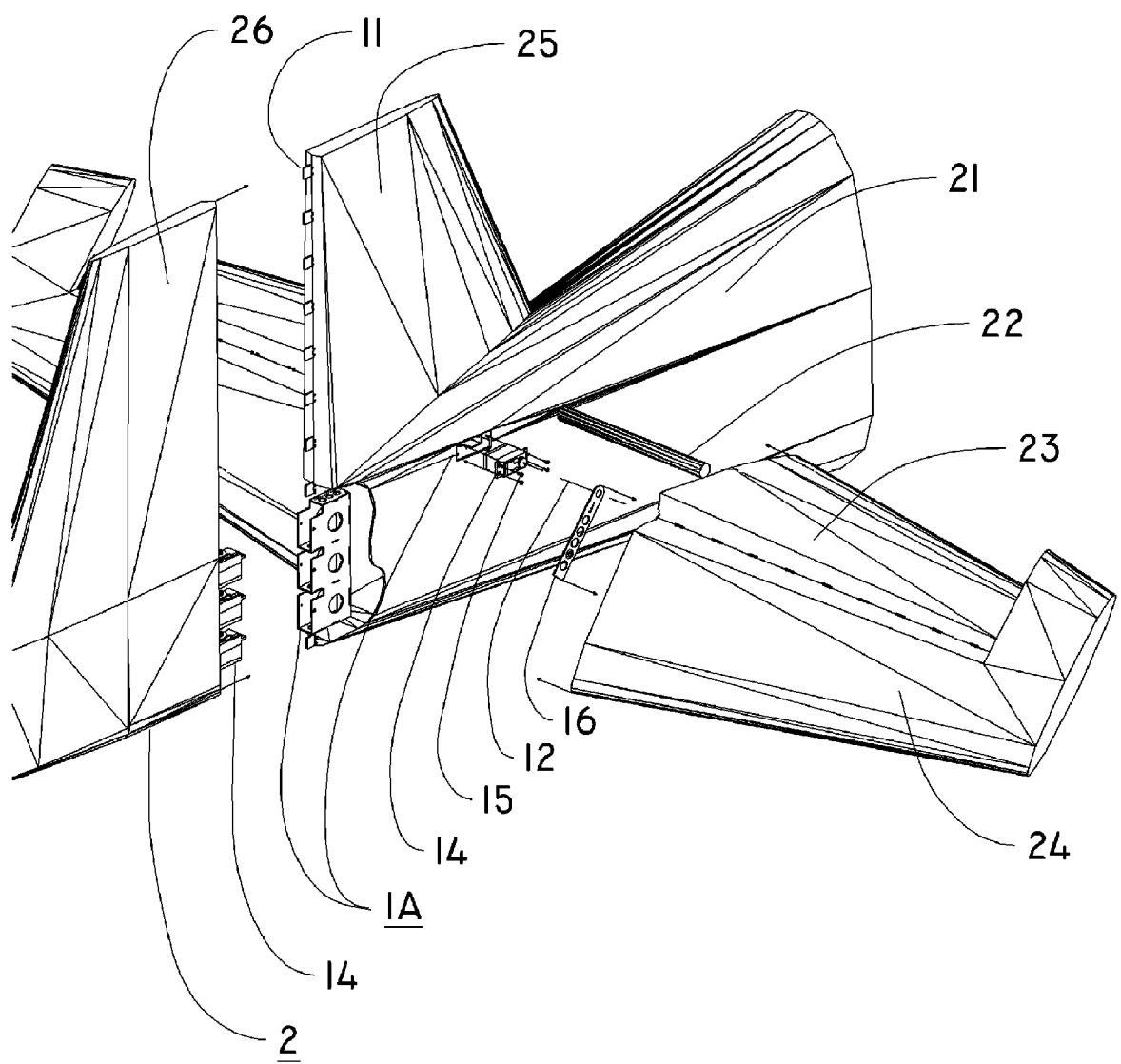
FIG. 5A is an exploded view showing two examples how this servo mount system can be used. The mount 1A and servo case 14 for the elevator 24 are installed in the fuselage empennage 21 and the horn 16 is attached to the inboard end of the elevator 24. The rudder 26 demonstrates a triple installation used to increase the power available to drive larger surfaces.
Figure 6A:
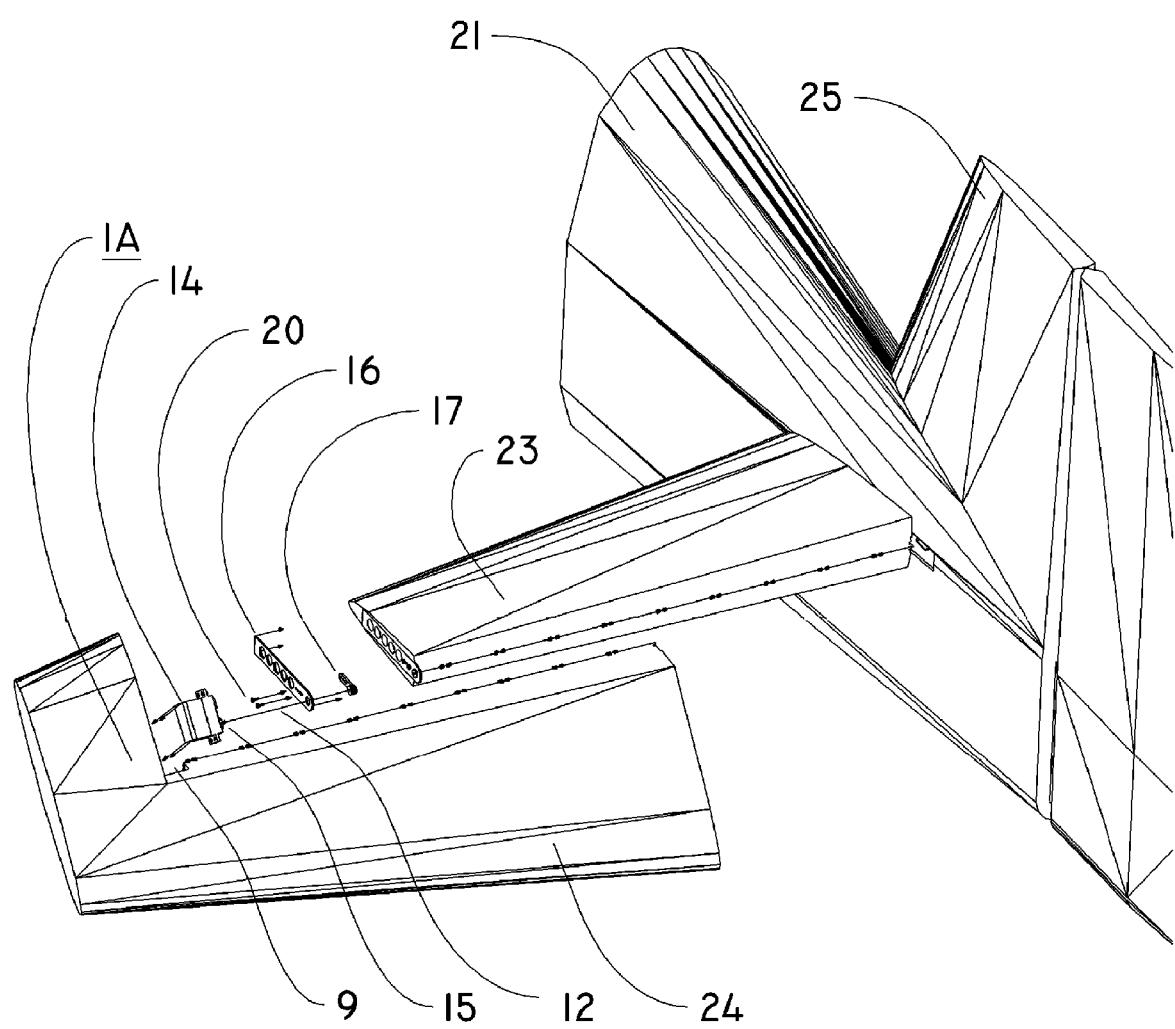
FIG. 6A is an exploded view of a configuration in which the servo mount 1A is installed within the elevator balance tab (mount not visible). The servo case 14 and mount 1A rotate with the control surface 24. The servo shaft 15 is mounted to the airframe 23 using a servo arm 17 and horn 16, as in the previous examples.

The horn 16, shown in FIG. 2, is also laser cut from 1/16" thick maple plywood. It has a hole precisely cut to accept the outer circumference of the portion of the servo arm 17 that receives the servo shaft 15—in this example that is a 3/8" circle. Two more precisely cut holes in the horn accept bolts 20 which attach the arm 17 to the horn 16. Other non-specific holes may be cut for lightening purposes. The horn 16 is rounded in the area that attaches to the servo arm 17 to provide clearance with the mounting box 1A as the control surface rotates. The end of the horn 16 opposite the servo arm 17 is shaped so it can be conveniently attached to the aircraft. In FIG. 2, the horn 16 takes the place of a structural rib for the control surface 13 and is permanently glued into the control surface 13 with wood glue. In FIG. 5A and FIG. 6A, the horn 16 is shaped appropriately to glue to the end of the control surface 24 and the end of the horizontal stabilizer 23 respectively.

The above description is common to all installations of the direct drive servo mount. The mount must now be installed on the aircraft in one of two possible configurations. These are:

(a) Airframe mounting. The servo mount 1A is installed on the non-rotating portion of the airframe 10, while the servo output shaft 15 is connected to—and rotates with—the control surface 13. The central axis of the servo output shaft 15 is located on, and is axially aligned with the hinge line 12. This embodiment is shown in FIG. 2 through FIG. 4C. Using the box 1A described in FIG. 1, the installation proceeds as follows:

(1) The control surface 13 is mounted onto the airframe 10 using removable hinges 11. This includes any type of hinge having a removable pin or other means by which the control surface can later be removed from the airframe. The hinges 11 cannot occupy the area where the servo mount 1A is to be installed.

Figure 1B:
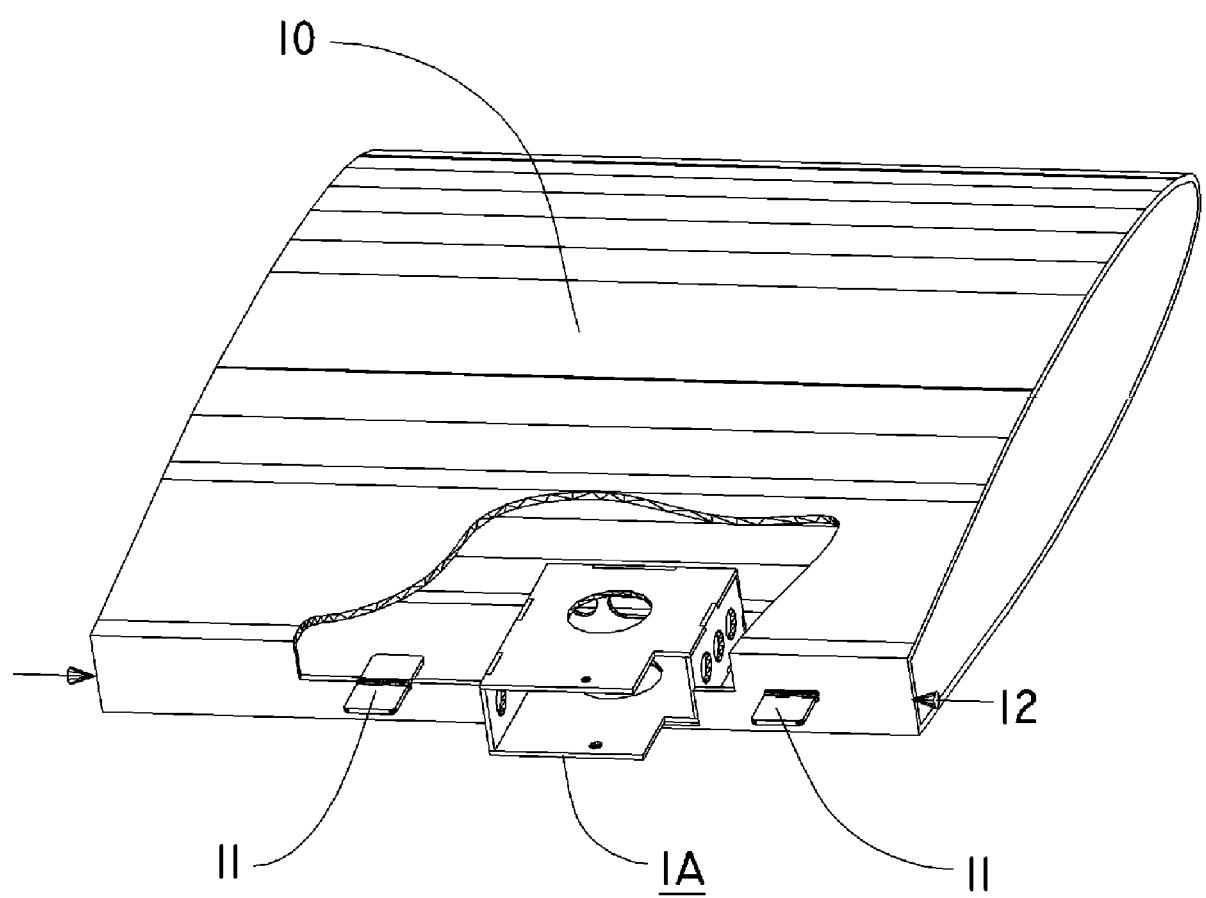
FIG. 1B is a view of the servo mounting box 1A as it is installed in the forward aerodynamic member of a wing airfoil 10. The top surface of the wing has been removed in the area of the mount for clarity.

(2) An opening is made in the back of the airframe to receive the mount 1A. The opening must be perfectly centered on the control hinge line 12. For the mount described above, the opening will be 0.885" high, 1.875" wide, and 2.31" deep. The mount 1A is installed in the opening and secured using wood glue as shown in FIG. 1B.

(3) A relief 19 is made in the control surface 13 to provide clearance for the portion of the mount 1A which extends behind the hinge line 12. It must provide clearance throughout the control's range of motion.

(4) The servo arm 17 is permanently attached onto the horn 16 using two 4-40×1/4" bolts 20. The horn/servo arm assembly is glued into place in the control surface 13. The horn 16 is centered laterally within the cutout 9 provided for it in the mounting box. The portion of the servo arm 17 which receives the servo shaft 15 is centered on the control hinge line 12.

(5) The servo shaft 15 is mounted onto the servo arm 17 and held in place with the retaining screw 18 provided by the servo manufacturer. The servo and control surface are now joined as an assembly 2.

(6) To complete the installation, the servo case 14 is slid into the mount 1A as the control surface/servo assembly 2 is positioned. The control hinges 11 are re-united, and a 4-40×1" bolt 5, washer 6 and nut 7 are installed to lock the servo case 14 into the mount 1A.

Figure 5B:
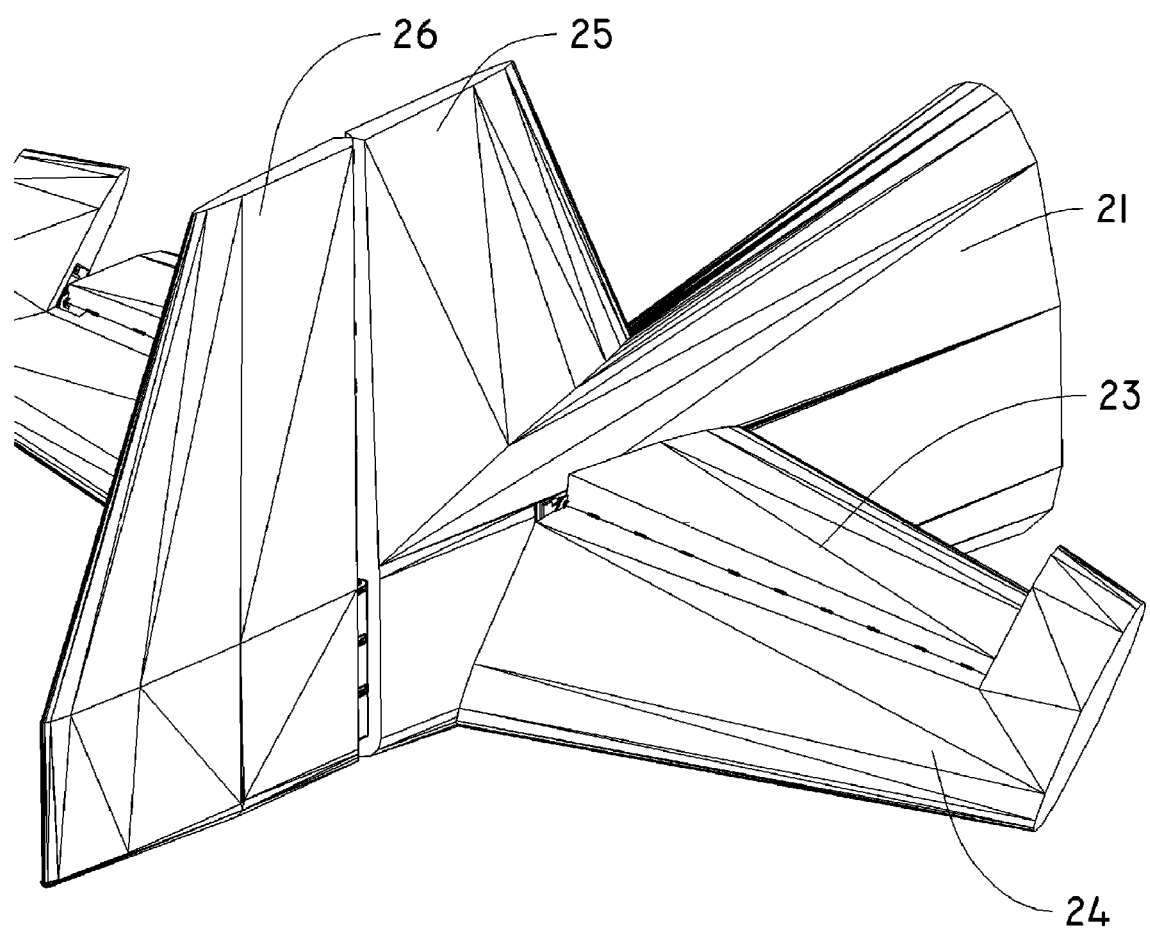
FIG. 5B is an assembled view of the installations shown in FIG. 5A. Note the clean aerodynamics of this servo mounting system.

(7) FIG. 5A and FIG. 5B show one possible variation of the fixed servo body installation. Here the same servo mount 1A is installed inside the fuselage empennage 21 at the location of the elevator hinge line 12. The open edge of the mount 1A is flush with the side of the fuselage 21. The horn 16 and servo arm 17 are secured to the elevator 24 at the inboard end of its span. The servo shaft 15 is attached to the arm 17, once again forming a control surface/servo sub assembly 2. The servo case 14 is slid into the mount 1A as the control sub-assembly 2 is installed on the spar tube 22.

Figure 6B:
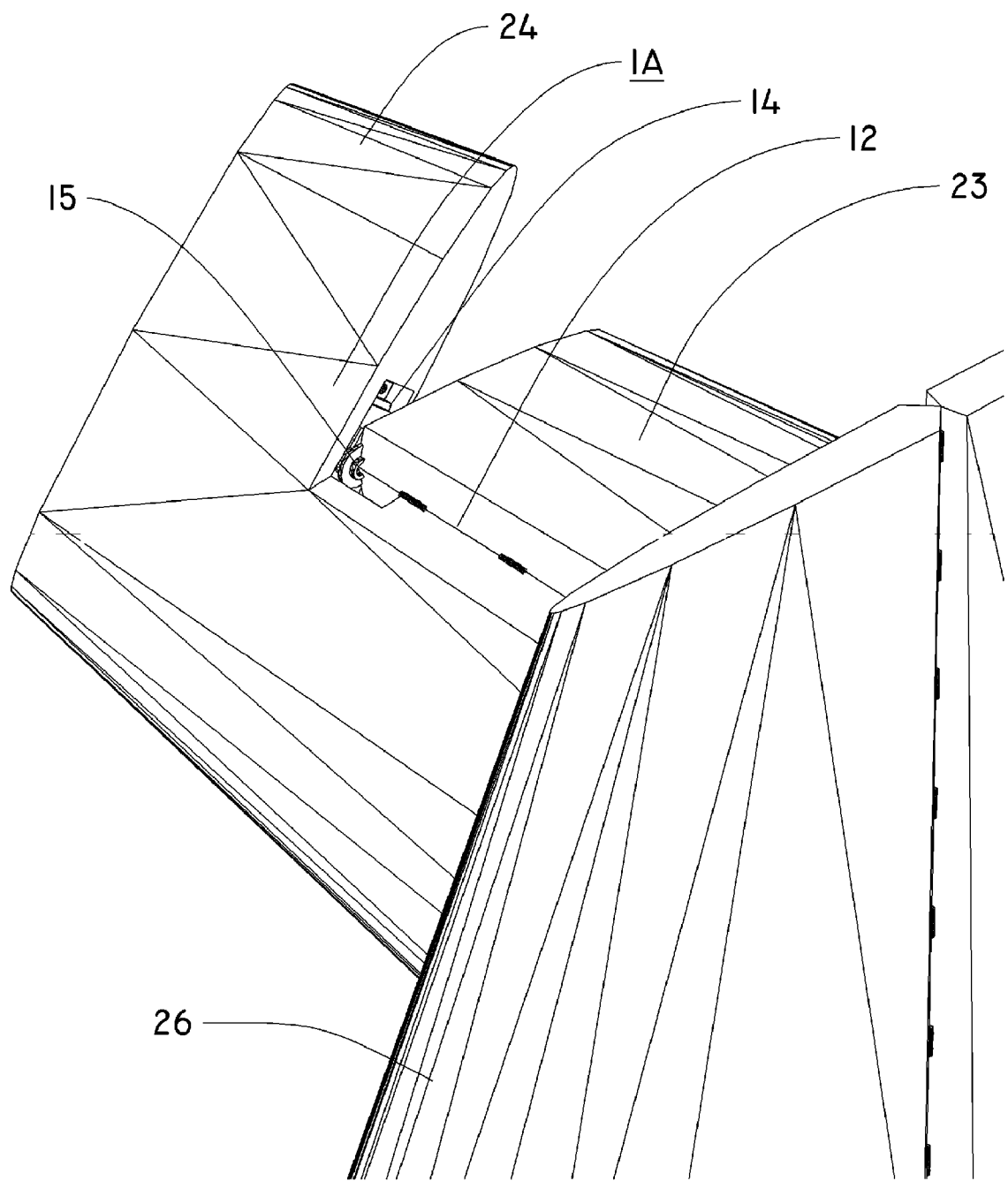
FIG. 6B is a view of the elevator in FIG. 6A, showing the completed installation. Visible is the servo case 14 within the mounting box 1A, which is inset within the elevator balance tab.

(b) Control surface mounting. The servo mount 1A is installed within the control surface so it rotates with the control. The central axis of the servo output shaft 15 is located on, and is axially aligned with the hinge line 12, and is coupled directly to the airframe. FIG. 6A and FIG. 6B show an example of this installation for an elevator drive.

(1) The horn/servo arm assembly 17/16 is fabricated as described above and is secured to the outboard end of the horizontal stabilizer 23 with wood glue. The portion of the servo arm 17 which receives the servo shaft 15 is centered on the control hinge line 12.

(2) The servo shaft 15 is attached to the servo arm 17 and is held in place with the retaining screw 18 supplied by the manufacturer. The servo shaft 15 is now directly connected to the airframe 23 and will remain fixed relative to it.

(3) The servo mount 1A is fabricated as described above, only it will be made with an interference fit on the servo case 14 (height dimension 0.759"). A hole is made in the balance tab of the elevator 24 to the exact dimensions of the mount 1A. The mount 1A is installed in the control surface 24, as shown, so it is entirely within the elevator 24.

(4) The servo mount 1A is slid over the servo case 14 as the elevator 24 is moved into position. Once the elevator 24 is in position, the hinges 11 are reunited to hold the surface 24 in place. In this installation no retaining bolt 5 is necessary.

Once the installation is complete, the control center point, direction of travel, and range of travel are set using electronic modification of the servo input signal. This modification can be accomplished using one of numerous commercially available electronic devices.

Definition List 1

| Term | Definition |
|---|---|
| Airframe | An aerodynamic member comprising the main portion of the aircraft, including wings 10, fuselage, empennage 21, vertical stabilizer 25, horizontal stabilizer 23, and canard; but excluding the moveable control surfaces. |
| Servo | A generic, commercially available, electro-mechanical mechanism that receives a control signal input, and responds by precisely positioning a rotating output shaft 15. All the elements of motor, gearing, and controls are contained within a common case 14 - usually rectangular in shape and having at least two sides parallel to one another. |
| Control surface or flight control | An aerodynamic member comprising any movable surface on the aircraft which is intended to deflect an air stream in a manner so as to modify the path or performance of that aircraft, including aileron 13, rudder 26, and elevator 24. |
| Linkage | A mechanism containing combinations of simple mechanical elements which convert rotating motion to linear motion and/or vise versa. |
| Servo arm | A simple mechanical lever 17 which attaches to the output shaft of a servo 15. It is normally provided with, or commercially available for, a particular servo. In past endeavors, it attaches the servo shaft 15 to a linkage, thereby converting rotating motion at the servo to linear motion at a link or cable. In this invention, the servo arm 17 is used in a non-standard fashion as a means to directly connect the servo shaft 15 to a horn 16. |
| Horn | A lever extension which provides a means of hard connection between a servo arm 17 and the aircraft structure. |

What is claimed is:

1. A system for powering an aerodynamic control member on an aircraft comprising:
   a first aerodynamic member;
   a second aerodynamic member;
   at least one hinge which joins said aerodynamic members to one another wherein said aerodynamic members rotate in relation to one another around a single hinge line;
   at least one servo having a case and a rotational output shaft, said rotational output shaft having a central axis of rotation;
   a first means for attaching said case to said first aerodynamic member, wherein the central axis of said rotational output shaft is located on and is axially aligned with said hinge line, wherein said first means for attaching said case to said first aerodynamic member is a servo mount comprising: a pair of rigid plates of predetermined size and shape, said plates being positioned parallel to one another at a distance apart approximating a minor dimension of said servo case wherein said case is sandwiched between said plates;
   a structural means securing said plates in relation to one another creating a hollow box-shaped structure with an opening of sufficient size to slidably insert said servo between said plates;
   a relief in said first aerodynamic member of sufficient size and shape to insert said box-shaped structure within said member;
   a means for securing said box-shaped structure within said first member, whereby said servo is configured for slidable insertion therein; and
   a second means for attaching said rotational output shaft to said second aerodynamic member, whereby said servo precisely positions said aerodynamic members in relation to one another and the same rotational motion and direction of rotation is preserved throughout the system.

2. The system of claim 1 wherein said servo mount further comprises a clamping means to draw said plates in a direction towards one another and at a location on said plates proximate to said opening, whereby said servo is firmly secured within said mount.

3. The system of claim 1 wherein said hinge further includes a removable pivotal pin, whereby said aerodynamic members are configured to be separated from one another by removing said pin.

4. The system of claim 1 further comprising an electronic means for adjusting and controlling the rotation of said servo output shaft in relation to said case, whereby the servo output is configured for precise adjustment and control.

5. The system of claim 1 further comprising a plurality of servos to power said aerodynamic members, whereby a force applied to rotate said aerodynamic members is capable of being multiplied while maintaining a narrow aerodynamic shape of said aerodynamic members.

6. The system of claim 1 wherein the second means for attaching said rotational output shaft to said second aerodynamic member comprises:
   a lever arm attached to said rotational output shaft,
   a fastening means for attaching said lever arm directly to said second aerodynamic member.

7. The system of claim 1 wherein the second means for attaching said rotational output shaft to said second aerodynamic member comprises a flexible torque coupler, whereby said coupler permits angular misalignment between the central axis of said rotational output shaft and said hinge line, while transmitting torque from said servo to said aerodynamic members.

8. A system for powering an aerodynamic control member on an aircraft comprising:
   a first aerodynamic member;
   a second aerodynamic member;
   at least one hinge joining said aerodynamic members to one another so said aerodynamic members rotate in relation to one another around a single hinge line;
   at least one servo having case and a rotational output shaft, said rotational output shaft having a central axis of rotation;
   a mount securing said servo case to said first member comprising:
   a pair of rigid plates of predetermined size and shape, arranged parallel to one another and spaced approximately equal to a minor dimension of said case, wherein said servo is configured for slidable insertion between said plates;
   a relief in said first aerodynamic member of sufficient size and shape to accept and directly support said plates, and said plates being located within said relief;
   a securing means for attaching said plates within said relief, said plates sandwiching said case in a location wherein the central axis of said rotational output shaft is located on and is axially aligned with said hinge line;

and said rotational output shaft is directly connected to said second member, whereby said servo precisely positions said aerodynamic members in relation to one another and the same rotational motion and direction is preserved throughout the system.

9. The system of claim 8 wherein said mount further comprises a clamping means to draw said plates in a direction towards one another, at a predetermined location on said plates, whereby said clamping means will positively secure said servo within said mount.

10. The system of claim 8 wherein said hinge further includes a removable pivotal pin, whereby said aerodynamic members are configured to be separated from one another by removing said pin.

11. The system of claim 8 further comprising an electronic means for adjusting and controlling the rotation of said servo output shaft in relation to said case, whereby the servo output is configured for precise adjustment and control.

12. The system of claim 8 further comprising a plurality of servos to power said aerodynamic members, whereby a force applied to rotate said aerodynamic members is capable of being multiplied while maintaining a narrow aerodynamic shape of said aerodynamic members.

13. A method of powering an aerodynamic control member on an aircraft comprising:

providing a first aerodynamic member;

providing a second aerodynamic member;

providing a means for hinging said aerodynamic members together wherein said aerodynamic members freely rotate in relation to one another around a single hinge line;

providing at least one servo having a case and a rotational output shaft, said rotational output shaft having a central axis of rotation;

providing a first means for attaching said case to said first aerodynamic member in a location which places the central axis of said rotational output shaft on and axially aligned with said hinge line wherein said first means for attaching said case to said first aerodynamic member is a servo mount comprising: a pair of rigid plates of predetermined size and shape, said plates being positioned parallel to one another at a distance apart approximating a minor dimension of said servo case wherein said case is sandwiched between said plates;

a structural means securing said plates in relation to one another creating a hollow box-shaped structure with an opening of sufficient size to slidably insert said servo between said plates;

a relief in said first aerodynamic member of sufficient size and shape to insert said box-shaped structure within said member;

a means for securing said box-shaped structure within said first member, whereby said servo is configured for slidable insertion therein; and providing a second means for attaching said rotational output shaft directly to said second aerodynamic member, whereby said servo positively and directly moves said aerodynamic members in relation to each other.

* * * * *